United States Patent

Schotten et al.

[11] 3,888,769
[45] June 10, 1975

[54] SECURING DEVICE FOR PRESS DIAPHRAGMS IN PLATE FILTER PRESSES

[75] Inventors: Alfons Schotten; Franz Heimbach, both of Duren, Germany

[73] Assignee: Eberhard Hoesch & Sohne, Duren, Germany

[22] Filed: Jan. 2, 1974

[21] Appl. No.: 429,769

[30] Foreign Application Priority Data
May 17, 1973  Germany............................ 2324876

[52] U.S. Cl................................. 210/227; 210/231
[51] Int. Cl............................................. B01d 25/12
[58] Field of Search .......... 210/227, 228, 229, 230, 210/231

[56] References Cited
UNITED STATES PATENTS

| 427,794 | 5/1890 | Remmers | 210/231 |
| 447,024 | 2/1891 | Coes et al. | 210/231 |
| 1,316,465 | 9/1919 | Stare | 210/228 |
| 1,801,933 | 4/1931 | Ouss | 210/231 |
| 2,761,567 | 9/1956 | Fischer | 210/229 X |

FOREIGN PATENTS OR APPLICATIONS

| 1,593,016 | 7/1970 | France | 210/230 |
| 975,662 | 11/1964 | United Kingdom | 210/229 |

Primary Examiner—Theodore A. Granger
Attorney, Agent, or Firm—Spencer & Kaye

[57] ABSTRACT

In a filter press, the inlet bore of the filter plates between which press diaphragms extend is provided with an annular groove which accommodates an annular enlargement of a skirt forming part of each press diaphragm. A split ring is disposed in and coaxially with the inlet bore and has an outer peripheral annular groove which accommodates a projecting portion of the enlargement extending radially outwardly from the groove provided in the filter plate.

12 Claims, 8 Drawing Figures

PATENTED JUN 10 1975 3,888,769
SHEET 1

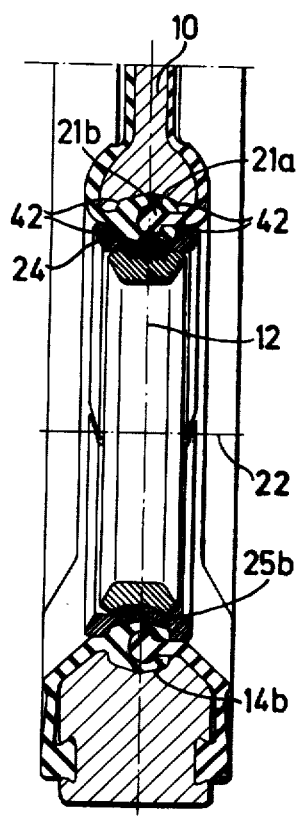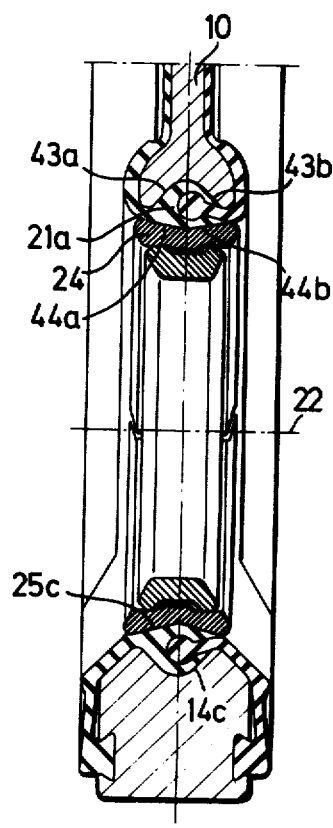

SECURING DEVICE FOR PRESS DIAPHRAGMS IN PLATE FILTER PRESSES

BACKGROUND OF THE INVENTION

The invention relates to filter presses of the type having a plurality of filter plates arranged in a face-to-face series. The filter plates have axially aligned inlet bores which define the slurry or stock inlet of the filter press. Between the filter plates extend the press diaphragms, each having an opening in alignment with the slurry inlet. In particular, the invention concerns a device for the fluid tight securing of the press diaphragms or similar components at the inlet bores. The securing of the marginal zones, defining the opening in the press diaphragm, in the zone of the slurry inlet opening of a plate filter press has been effected heretofore by simply gluing the edge zone of the diaphragm opening to the marginal zones of the slurry inlet bore of the filter plate. Such a solution, however, is not reliable because of the presence of substantial shearing forces which are generated during the pressurizing step and which tend to separate the bond between diaphragm and plate. Generally, on that side of each press diaphragm which is oriented away from the associated filter plate, there is positioned a filter cloth which also is secured to the filter plate about the inlet bore. Although a fluid tight seal between the filter cloth edge and the filter plate is significant, it is endangered if the bond between the press diaphragm and the filter plate deteriorates. Thus, a reliable securing of the diaphragm edges in the zone of the stock inlet opening of the filter plates is of particular significance. A reliable connection between the diaphragm edges in the zone of the stock inlet opening of the filter plate is further made difficult by the fact that — contrary to the securing of the diaphragm edges to the outer filter plate edges — the bond between diaphragm and plate in the zone of the stock inlet remains unaided by the closing force of the press. Thus, a glue-type bond of known structure is particularly endangered, since the counteracting effect of such closing force is not present.

The provision of a vulcanized bond between diaphragm and plate preconditions a matching of a pair of materials. Further, in case of a vulcanized bond, a removal of the diaphragm, for example, for replacement, is possible only if the base plate is at least partially destroyed. Partial vulcanization has also not been proven effective, since a glue-type bond which has to be additionally provided, is adversely affected by the heat present during the vulcanizing step.

The difficulty in proceeding similarly to the securing of the filter cloths resides in the fact that in known means for attaching filter cloths to the plates, materials are used which, due to corrodibility, cannot find application in diaphragm-to-plate seals.

The basic structure from which the invention has been developed is a known filter cloth securing means which, in the zone of the stock inlet bore, comprises an annular groove provided in the filter plate. The annular groove receives from both sides annular skirts which form part of the filter cloths. In the zone of the bore, these skirts are in an overlapping relationship and are clamped by a snap ring. In a known structure of this type, such as disclosed, for example in FIG. 2 of French Pat. No. 1,593,016, the filter cloths do not extend into the zone of the plate opening (stock inlet bore), but are sealed merely by the flange at the skirts. In this manner, both the filter cloths and the skirt flanges are pressed sealingly against the plates by the slurry pressure. The skirts which are in a simple overlap in the zone of the base of the annular groove are, in the annular groove which has a rectangular cross section, maintained in position by a split ring. The cross-sectional outline of the split ring corresponds to that of the groove cross section. Such a securing means which proved to be satisfactory for filter cloths, is, however, insufficient for use in connection with press diaphragms, since the latter would be pulled out of the plate bore by the stock pressure.

SUMMARY OF THE INVENTION

It is an object of the invention to provide an improved means for securing press diaphragms to the zone of the stock inlet bore of filter plates in plate-type filter presses in a reliable manner to withstand high stock pressures which tend to separate plate and diaphragm.

It is a further object of the invention to provide a securing means of the aforenoted type which is independent from, but may be combined with, the securing means for the filter cloths.

These objects and others to become apparent as the specification progresses, are accomplished by the invention according to which, briefly stated, each diaphragm is provided with a skirt, the end of which is maintained by a split ring in an annular groove provided in each filter plate. Further, the skirt end positioned in the annular groove has an annular enlargement which is received in the annular groove and projects therefrom towards the bore axis and is supported by an annular groove provided in the external periphery of the split ring.

It is an advantage of the afore-outlined arrangement according to the invention that a reliable anchoring of the enlargements of the diaphragm skirts to the stock inlet bore of the filter plate is ensured, so that even at high pressures which tend to pull out the skirts from the inlet bore, the skirts and the plates are firmly held together.

BRIEF DESCRIPTION OF THE DRAWINGS

FIGS. 4, 5, 6, 7 and 8 are sectional views of further preferred embodiments of the invention.

DESCRIPTION OF THE PREFERRED EMBODIMENTS

Figure 1:
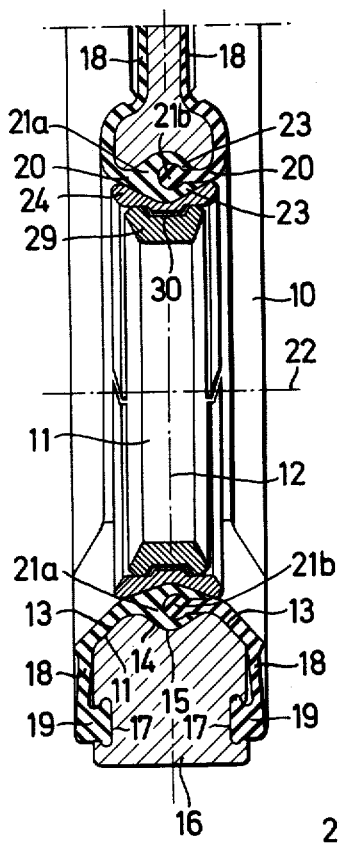
FIG. 1 is a sectional view of a preferred embodiment of the invention.

Turning now to FIG. 1, in a filter plate 10 which is one of a plurality of similar filter plates arranged in a face-to-face series in a filter press (not shown), there are provided a slurry or stock inlet bore 11 which is formed of mutually symmetrical frustoconical lateral faces 13 which converge toward the central plane 12 of the filter plate and an annular groove 14 disposed between the lateral faces 13. The annular groove 14 is formed of two lateral faces which merge in a rounded groove base 15. The lateral faces of the annular groove 14 also have a frustoconical configuration. They are arranged symmetrically and oppositely oriented to one another and merge arcuately with the lateral faces 13.

At opposite sides of the plate edge 16, there are provided dovetail grooves 17 into which extend, on both sides of the plate 10, complemental, dovetail shaped ribs 19 of two, only fragmentarily shown dish-shaped press diaphragms 18. The components 17 and 19 are situated in the vicinity of the outer edge of the plate edge 16. The particular dish-shaped configuration of the press diaphragms as well as their sealing by means of components 17 and 19 does not form a part of this invention.

According to the invention, the two press diaphragms 18 on opposite sides of the plate 10 are provided, in the zone of the stock inlet bore 11, with oppositely oriented skirts 20 which extend axially into the inlet bore 11 and which terminate in annular enlargements 21a and 21b. As it may be observed in FIG. 1, the enlargement 21a of the left-hand skirt 20 has a forked shape, the outer configuration of which corresponds to the annular groove 14 of the stock inlet bore in the filter plate and has a symmetry axis which extends parallel to the bore axis 22. The fork terminals 23 of the left-hand skirt 20 surround the welt-shaped enlargement 21b of the other, right-hand skirt 20, whereby an interlocking engagement between the two skirts 20 is obtained.

Figure 2:
FIG. 2 is a sectional view of one component of the same embodiment.
Figure 3:
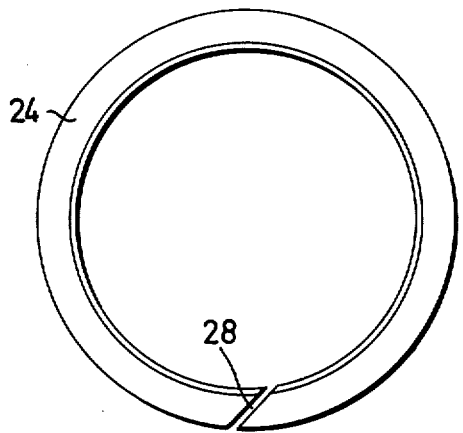
FIG. 3 is a plan view of the same component.

The enlargements 21a and 21b of the two skirts 20 are pushed into one another during assembly in a direction parallel to the bore axis 22. For the radial support of the skirts 20, there is provided a split ring 24 which is inserted into the circular opening defined by the left-hand skirt 20. The split ring 24 is illustrated in FIGS. 2 and 3 in axial section and in plan view, respectively. The split ring 24 which is coaxial with the bore axis 22 has a peripheral annular groove 25 which is formed of inclined frustoconical side walls 26 that merge in a rounded groove base 27. As it is well observable in FIG. 1, when the split ring 24 is in place in the bore 11, the peripheral groove 25 is arranged substantially as a mirror image of groove 14. Thus, while groove 14 of the plate 10 conforms to the outer peripheral face of the enlargement 21a, the groove 25 of the split ring 24 conforms to the inner peripheral face of the enlargement 21a. The inner peripheral face of the enlargement 21a bounds that portion of this enlargement that projects radially beyond the groove 14. Due to the radially outwardly directed force of the split ring 24 and the inclined, frustoconical configuration of the grooves 14 and 25, the enlargements of the skirts 20 are axially compressed. In this manner, a good seal is ensured between any diaphragm 18 and the associated filter plate 10 about the inlet bore 11. The ring 24 has a discontinuity at 28 which, in a relaxed condition of the split ring 24, has a width adapted to be reduced in the assembled condition of the ring to provide a bias therefor. During assembly, the ring 24 is compressed to such an extent that the ring ends overlap so that it may be inserted in an axial direction into the bore 11 over the enlargements 21a, 21b of the skirts 20. Thereafter, the ring 24 is permitted to assume its normal assembled condition in which its split ends are substantially flush with one another. In this manner, the ring 24 reliably anchors the enlargements 21a, 21b of the skirts 20.

For further ensuring the operational safety of the pressure filter, a support ring 29 is inserted into the bore 11 and is held by the split ring 24. The support ring 29 has an external peripheral locking groove 30 which interlocks with an inner circumferential locking rib 31 provided on the split ring 24 (FIG. 2). This interlock prevents an axial displacement of the support ring 29 with respect to the split ring 24. Since the support ring 29 has a closed structure and is therefore substantially rigid, the split ring 24 will be firmly held in place. It is apparent that the interlock between components 30 and 31 is brought about by virtue of the elastic deformation of the split ring 24 and the skirts 20 of the diaphragms 18. The support ring 29 is particularly useful in preventing a deformation of the split ring 24 even under the highest operational stresses, especially in cases where — for anti-corrosion purposes — the filter plate 10 and the split ring 24 are made of a synthetic or like material.

Figure 4:
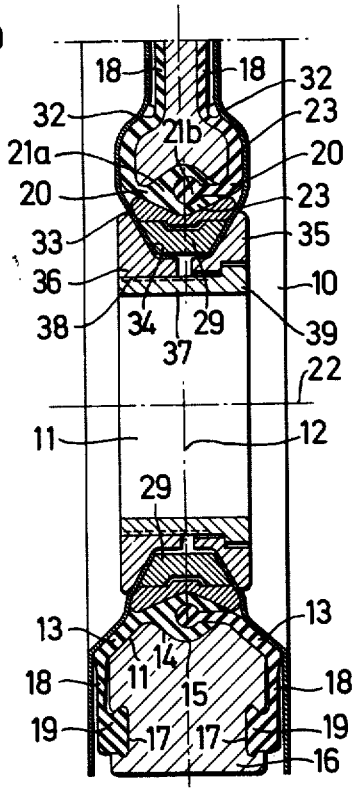

Turning now to FIG. 4, there is shown another embodiment of the invention, according to which filter cloths 32 lie face-to-face on the dish-shaped diaphragms 18. The filter cloths have a circular opening to be maintained in alignment with the slurry inlet 11. For this purpose, an annular marginal zone of each filter cloth 32 engages, at one and the other side of the slurry inlet 11, the aligned external lateral wall faces 33 and 34 of the split ring 24 and the support ring 39, respectively. The annular marginal zones of the filter cloths 32 are clamped against the faces 33, 34 by inner lateral faces of two oppositely inserted clamping rings 35, 36 held in place by a threaded sleeve 37. The outer thread of the sleeve 37 engages a complemental inner thread of the clamping ring 36, while the clamping ring 35 is retained by a collar 39 of the sleeve 37. The collar 39 is in engagement with an annular radial shoulder face of the clamping ring 35. In the embodiment according to FIG. 4, a combined structure is provided for holding in place both the skirts 20 of the diaphragms 18 and the filter cloths 32. It is noted that the clamping ring assembly 35, 36, 37 may replace the support ring 29, for example, in the FIG. 1 embodiment for securing, similarly to the support ring 29, the split ring 24 against deformations.

Figure 5:
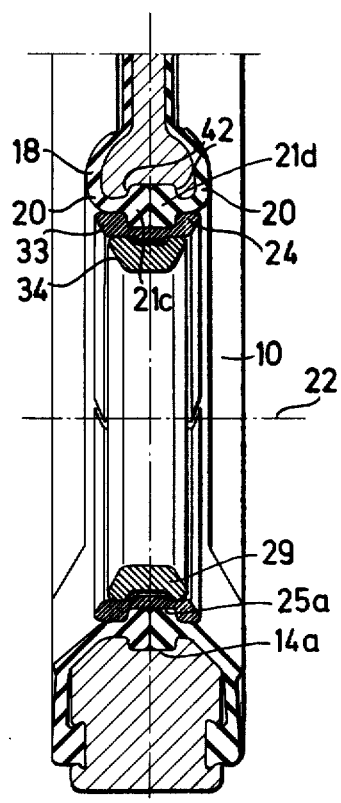
Figure 6:
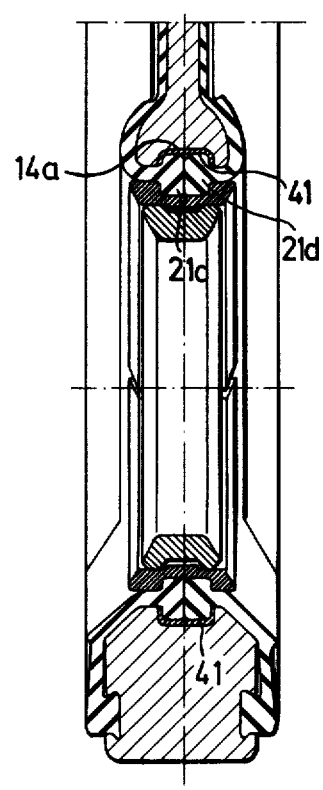

Turning now to FIG. 5, there is illustrated an embodiment generally corresponding to that shown in FIG. 1, except that the enlargements 21c and 21d of the skirts 20 have identical symmetric configurations and have a generally hammer-shaped section. Accordingly, to conform to the combined outline of enlargements 21c and 21d, the annular groove 14a on the pressure plate 10 and the annular groove 25a on the split ring 24 have a rectangular section. It is noted that in this embodiment, the aligned oblique faces 33 and 34 of the split ring 24 and the support ring 29 serve for improving the flow dynamics of the liquid that passes through the bore 11. The hammer-shaped configuration of the enlargements 21c and 21d have the advantage that the forces exerted upon the split ring 24 by the diaphragms 18 act exclusively parallel to the bore axis 22 (that is, they have no radial components) and thus cancel one another. A further improvement in this direction is illustrated in FIG. 6 wherein there is provided a bilaterally adhesive sealing strip 41 between the enlargements 21c, 21d, on the one hand and the annular groove 14a in the plate 10, on the other hand.

Turning now to the embodiment illustrated in FIG. 7, the fork-shaped enlargement 21a has substantially radially extending anchoring faces 42 on both sides of the central plane 12 of the plate 10. The anchoring faces 42 conform to the accordingly shaped annular grooves 14b and 25b of the plate 10 and the split ring 24, respectively. In this manner, the characteristics of the mutual anchoring of the enlargements 21a, 21b according to FIG. 1 are combined with those pertaining to the radial force transmission by the compressed diaphragms 18 to the split ring 24 and the plate 10.

Turning now to FIG. 8, there is illustrated another modification of the embodiment shown in FIG. 1. According to this modification, the faces 43a and 43b of the enlargement 21a at the outer periphery of the skirt 20 are inclined at a relatively large angle of approximately 45° with respect to the bore axis 22, whereas the faces 44a and 44b of the enlargement 21a at the inner periphery of the same skirt 20 are inclined at a relatively substantially smaller angle with respect to the bore axis 22. Accordingly, the conforming groove 14c of the plate 10 is relatively deep, while the conforming groove 25c in the split ring 24 is relatively shallow. Such an arrangement is advantageous in that most of the tension forces exerted on the diaphragm are transmitted by the diaphragm to the plate 10 rather than to the support ring 24. It is noted that such an arrangement in which the groove in the split ring is shallower than the groove in the filter plate, and which may be incorporated, for example, in the FIG. 6 and FIG. 7 embodiments as well, permits a less sturdy dimensioning of the support ring 29 due to the lessened stresses exerted thereon.

It will be understood that the above description of the present invention is susceptible to various modifications, changes and adaptations, and the same are intended to be comprehended within the meaning and range of equivalents of the appended claims.

We claim:

1. In an arrangement composed of a filter plate and a press diaphragm, a device for the fluid tight securing of the press diaphragm to the filter plate in the zone of a slurry inlet bore provided in the filter plate, the bore having an axis, the diaphragm extending along the filter plate and has an opening in alignment with the inlet bore, comprising in combination:
   a. means defining an annular groove in said filter plate, said groove surrounding said inlet bore and arranged coaxially therewith;
   b. a skirt forming part of said diaphragm, said skirt bounding and surrounding said opening in said diaphragm and extending axially into said inlet bore of said filter plate, said skirt having an annular terminal enlargement surrounding said bore axis and conformingly received in said groove, said terminal enlargement having a projecting portion extending radially away from said groove towards said bore axis; and
   c. a split ring disposed in said bore coaxially with said axis, said split ring including means defining an outer peripheral annular groove, said projecting portion of said terminal enlargement being conformingly received in and supported by said peripheral annular groove in said split ring.

2. A device as defined in claim 1, said split ring having an inner periphery, further comprising a support ring arranged coaxially with the bore axis and having an outer periphery in engagement with the inner periphery of said split ring, and interlocking means coupling said support ring to said split ring for preventing an axial displacement of said support ring.

3. A device as defined in claim 2, wherein said interlocking means includes means on one of said rings defining a peripheral annular locking groove oriented towards the other of said rings and a peripheral locking rib provided on said other of said rings, said locking rib is received in said locking groove.

4. A device as defined in claim 2, wherein said filter plate has a central plane, said split ring and said support ring include, at both sides of said central plane, radially inwardly converging lateral annular faces which are substantially symmetrical to one another with respect to said central plane, and said lateral annular faces on said split ring and said support ring at the same side of said central plane are in alignment with one another.

5. A device as defined in claim 4, including clamping means for securing a filter cloth against the aligned annular faces of said split ring and said support ring.

6. A device as defined in claim 5, wherein said clamping means includes two axially adjacent clamping rings disposed coaxially with said bore axis and having lateral faces for pressing the filter cloth against said aligned annular faces of said split ring and said support ring; a sleeve member disposed coaxially with said bore axis and radially inwardly of said clamping rings; and coupling means connecting said sleeve to said clamping rings for urging said clamping rings axially toward one another.

7. A device as defined in claim 6, wherein said coupling means includes interengaging threads on said sleeve member and on one of said clamping rings and a peripheral collar integral with said sleeve member, and said collar is in engagement with an annular radial wall face of the other of said clamping rings.

8. A device as defined in claim 1, wherein said annular groove in said filter plate and in said split ring have frustoconical side walls for axially compressing the diaphragm skirt accommodated in said grooves.

9. A device as defined in claim 1, wherein there are a plurality of said diaphragms, a separate one of said diaphragms extends along either side of said filter plate, and said annular terminal enlargement of the skirt of the diaphragm disposed along the one side of said filter plate has a forked configuration to receive and surround the annular terminal enlargement of the skirt of the diaphragm disposed along the other side of said filter plate.

10. A device as defined in claim 1, including a bilaterally adhesive strip inserted in said filter plate between said enlargement and said annular groove in said filter plate.

11. A device as defined in claim 1, wherein said enlargement includes anchoring faces arranged normal to said bore axis for transmitting to said means defining said grooves stresses generated in said diaphragm.

12. A device as defined in claim 1, wherein the groove in said split ring is shallower than the groove in said filter plate, whereby the axial forces transmitted by said enlargement to said filter plate are greater than those transmitted by said enlargement to said split ring.

* * * * *